United States Patent [19]
Cantrell

[11] 3,889,108
[45] June 10, 1975

[54] ADAPTIVE LOW PASS FILTER

[75] Inventor: Ben H. Cantrell, Oxon Hill, Md.

[73] Assignee: The United States of America as represented by the Secretary of the Navy, Washington, D.C.

[22] Filed: July 25, 1974

[21] Appl. No.: 491,890

[52] U.S. Cl. ................ 235/152; 235/156; 328/165; 328/167; 333/17; 333/18; 333/28 R; 333/70 R

[51] Int. Cl. .......................... G06f 15/20; H03g 5/24

[58] Field of Search ............ 235/152, 156; 328/165, 328/167; 333/17, 18, 28 R, 70 R

[56] References Cited

UNITED STATES PATENTS

| | | | |
|---|---|---|---|
| 3,428,791 | 2/1969 | Chandos | 235/151.1 |
| 3,466,572 | 9/1969 | Hanna et al. | 333/17 |
| 3,528,040 | 9/1970 | Galvin | 333/18 |
| 3,559,081 | 1/1971 | Baudino et al. | 328/167 |
| 3,588,548 | 6/1971 | Williams | 328/165 X |
| 3,639,739 | 2/1972 | Golden et al. | 235/152 |
| 3,678,416 | 7/1972 | Burwen | 333/17 |
| 3,706,045 | 12/1972 | Salvert | 328/165 |
| 3,742,395 | 6/1973 | Yoneyama | 333/17 |
| 3,753,159 | 8/1973 | Burwen | 333/17 |
| 3,819,920 | 6/1974 | Goldfischer | 235/152 |

*Primary Examiner*—Malcolm A. Morrison
*Assistant Examiner*—R. Stephen Dildine, Jr.
*Attorney, Agent, or Firm*—R. S. Sciascia; Arthur L. Branning; Norman V. Brown

[57] ABSTRACT

An adaptive low-pass recursive filter adaptively changes its bandwidth filtering characteristics in accordance with the bandwidth of the incoming signal. This results in an input signal $w(k)$ changed into output signal $x(k)$ in accordance with the equation $x(k) = a(k)\ x(k-1) + (1-a(k))\ w(k)$, where $k$ is a sampling-interval and a is the adaptive value representing ratio of known noise power to average error between the filter input and output.

4 Claims, 5 Drawing Figures

ADAPTIVE LOW PASS FILTER

BACKGROUND OF THE INVENTION

The present invention is related to adaptive filters, and more particularly to adaptive low-pass recursive filters.

Considerable attention has been directed toward the development of various types of filters, and especially toward adaptive filters. An adaptive filter is intended to do what its name implies. It is a filter which filters an incoming signal but which adapts or changes its filtering characteristics in accordance with a change of some condition, usually related to the signal being filtered.

There exist many adaptive filter designs, as for example the Kalman filter (based upon what is known as the least mean square criterion), the phase-locked loop, and the adaptive array antenna. Each of these adaptive filters is suited to a particular class of problems. For example, the phase-locked loop adaptively adjusts the frequency of oscillation, and an adaptive antenna places nulls in an antenna pattern to reject sidelobe interference in a changing interfering environment.

The present invention is an adaptive filter which is particularly well suited for a special class of problems which generally relate to the filtering of a signal to remove higher-order frequency components. It is desirable to remove these high frequency components when they are not related to the true signal but are part of signal noise which causes interference and tends to mask the true signal.

An interesting aspect of a signal is that it is physically equivalent to a group of sine-waves of proper frequency and amplitude added together. No matter how odd-shaped the signal may appear, it still is always equivalent to this aggregation of very simple sine-waves. Generally when a signal is smooth and slowly varying its sine-wave components are primarily of low frequency. On the other hand, when a signal is wildly fluctuation or has sharp points or discontinuities, then a much broader range of frequency components are present. Generally, in addition to low frequency components, many more somewhat higher frequency components are present. Signal noise, often termed white noise, is composed of sine-wave frequency components of all frequencies - from very low to very high frequencies. Each of these frequency components are also generally of equal intensity level, known as noise power.

Thus, when a signal is varying smoothly and slowly, primarily low frequency components are present. Now if this slowly varying signal (which contains both true signal and noise components) is applied to an adjustable low-pass filter, the filter can be adjusted to pass only low frequency components thus completely passing the signal, while allowing only the lower frequency components of the noise to pass. Thus, the output of the adjustable filter contains primarily all components of the true signal while much of the noise signal components have been removed.

For example, when attempting to hear someone speak over the hissing noise made by steam escaping from a radiator, a filter of this nature would be useful since it would allow almost all the low-frequency components constituting the voice signal to pass but would prevent almost all the higher-frequency components constituting a very large part of the interfering hissing noise from passing.

If the signal of interest changes from the slowly-varying type to one widely fluctuating, then the frequency components of the signal contain higher-frequency components in addition to lower-frequency components. But, it is still desirable to eliminate as many of the noise frequency components as possible. It would still be helpful, for instance, to use the low-pass filter to hear a very high pitched instrument over the shriek made by the escaping steam. In this case the filter would have to be adjusted to allow the higher frequency components of the desired signal to pass while preventing passage of the still higher frequency components of the steam noise.

If an observer then was attempting to listen over an escaping steam hiss, first to a person speaking then to a high pitched instrument and then again to the person speaking, it would be desirable for him to listen through a filter that changed what frequency components it allowed to pass.

The filter of the present invention performs this kind of function.

SUMMARY OF THE INVENTION

The adaptive filter of the present invention is designed to pass low-frequency components (below a selected low-frequency cut-off point), by resort to a recursive adaptive process which utilizes information from prior inputs and outputs of the filter in order to change the filter cut-off point to a higher or lower frequency. The filter accomplishes this process through a series of essentially digital steps.

In operation, the input signal $w(k)$, during a sampling-interval $k$, is compared with the prior value of an output signal $x(k\text{-}1)$. The difference between the input and output signals forms an intermediate error signal which is combined with a weighted average of the prior output signal to form a second intermediate error signal. An adaptive error signal $a(k)$ is formed by dividing a value representing the expected noise power in the signal by the second intermediate error signal.

The adaptive error signal $a(k)$ is then used to adjust two multiplier controlling the combination of present input and prior output signals to form the present filter output signal. The first multiplier determines the weight to be accorded to the input signal, while the second determines the weight to be accorded to the average prior output signal, stored in a register.

The actual operation is accomplished by this recursive process in accordance with the equation $x(k) = a(k)\ x(k-1) + (1 - a(k))\ w(k)$.

It is an object of the present invention to adaptively change the manner in which an input signal is filtered by resort to a recursive feedback means.

It is a further object of the present invention to vary the bandwidth of a filter in accordance with changes in bandwidth of the filter input signal.

It is a still further object of the present invention to adaptively change the manner in which an input signal is filtered in accordance with the equation $x(k) = a(k)\ x(k-1) + (1-a(k))\ x(k)$, wherein $x$ represents the output and $w$ the input of a filter, a represents an adaptive error signal, and $k$ and $1-k$ represent a sample period and prior sample period, respectively.

Other objects, advantages and novel features of the invention will become apparent from the following detailed description of the invention when considered in conjunction with the accompanying drawings wherein:

DETAILED DESCRIPTION

Figure 1:
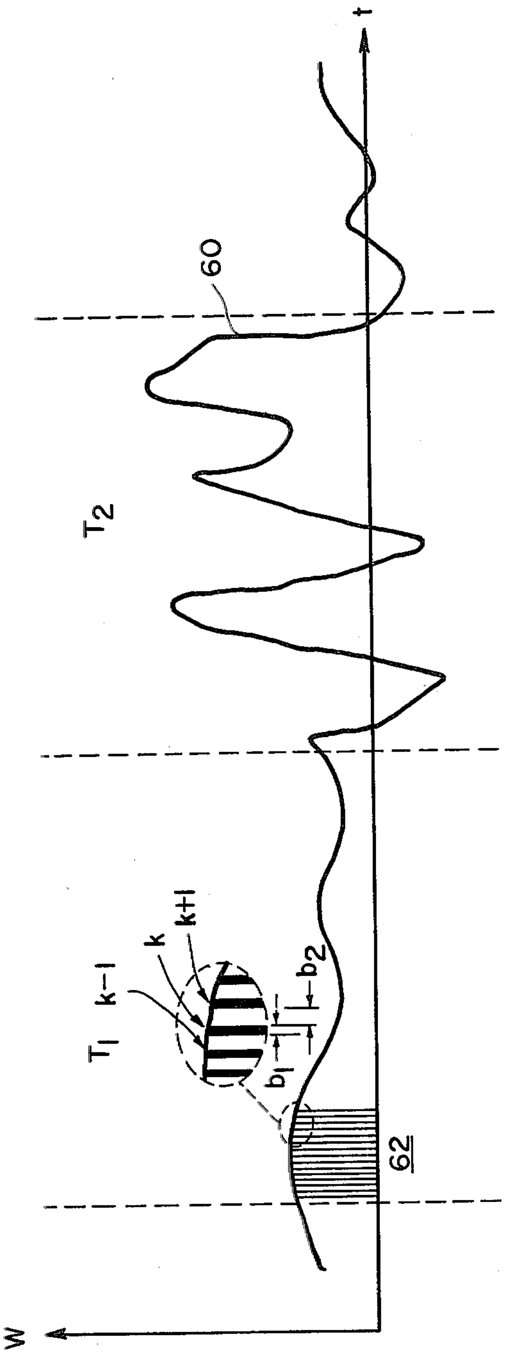
FIG. 1 depicts a time varying signal applied as an input to the circuitry of the present invention.
Figure 3:
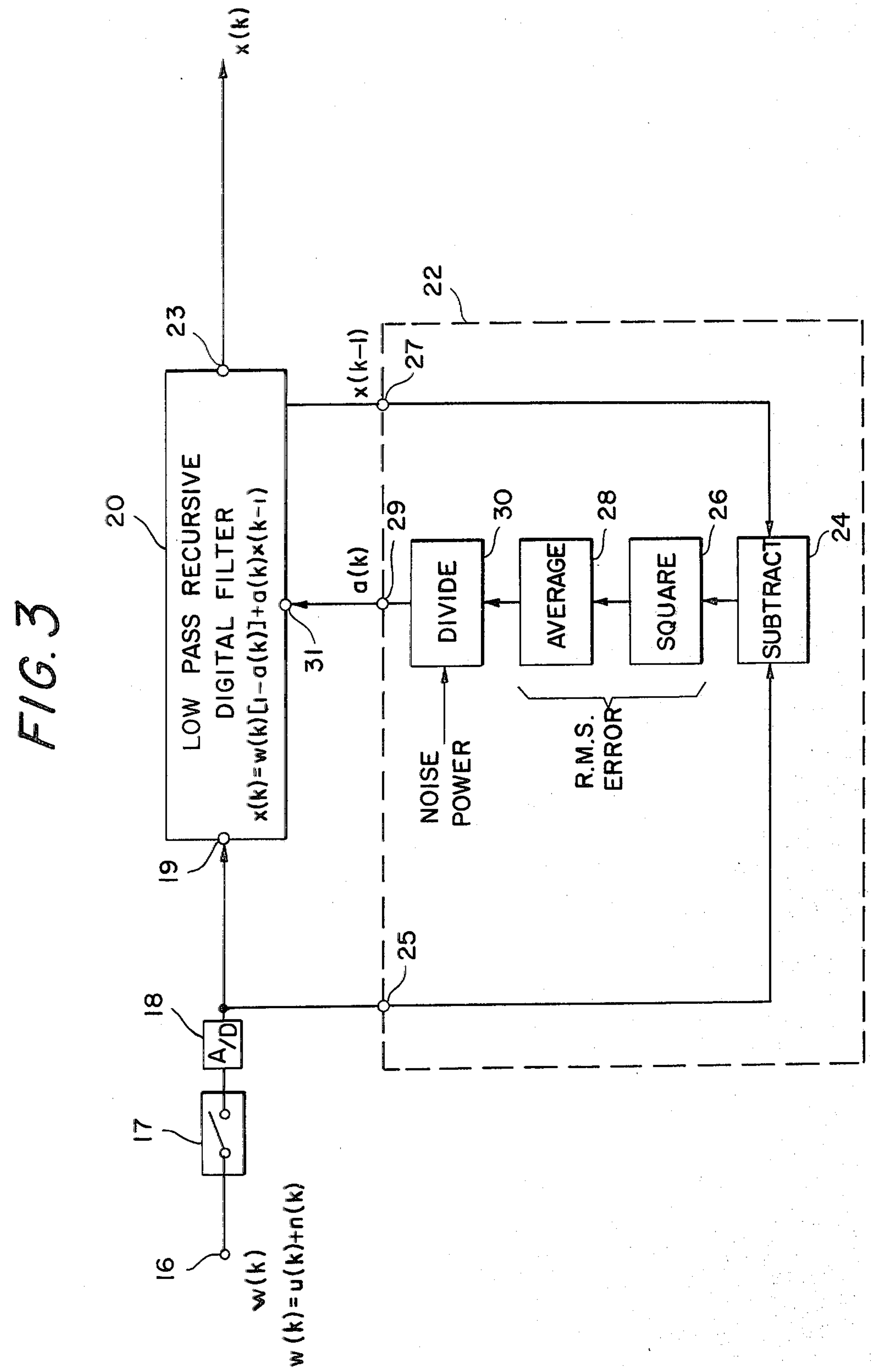
FIG. 3 is a functional block diagram of an embodiment of the present invention.
Figure 4:
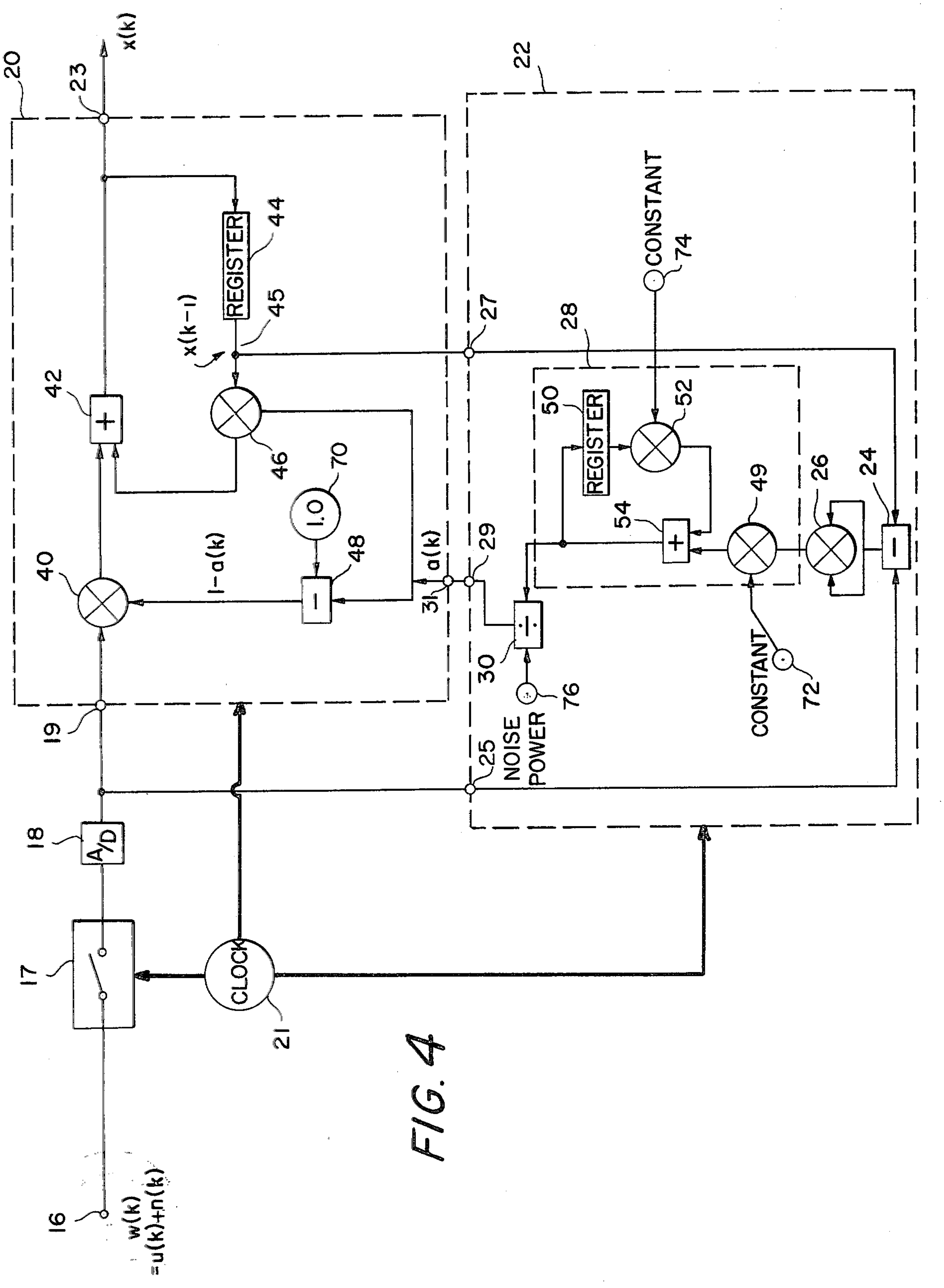
FIG. 4 is a schematic diagram of the embodiment depicted in FIG. 3.

An analog signal, illustrated in FIG. 1, is supplied to the input terminal 16 of an electronic switch 17, as shown in FIGS. 3 and 4. The output of electronic switch 17 is connected to an analog-to-digital converter 18 which is in turn connected to an input terminal 19 of a low-pass recursive digital filter 20 having an output terminal 23.

A feedback means, generally designated by reference numeral 22, has two input terminals 25 and 27, respectively coupled to input terminal 19, and through a delay means 44 to output terminal 23 of recursive filter 20. Feedback means 22 has an output terminal 29 connected to a control terminal 31 of recursive filter 20.

Feedback means 22 is comprised of a subtracting device 24, a squaring device 26, an averaging device 28, and a divide device 30, connected in the order recited. Input terminals 25 and 27 of feedback means 22 are connected to the inputs of sutract device 24. The output terminal 29 of divide device 30 forms the output of feedback means 22 and is connected to control terminal 31 of filter 20.

FIG. 4 more clearly depicts the arrangement of the elements shown in the functional diagram of FIG. 3. To implement the present invention only four types of functional elements are necessary - an adder, a subtractor, a multiplier, and a register. Construction and operation of these elements are extremely well known and dealt with in numerous textbooks and electronic components catalogs. Therefore they shall not be dealt with in detail in this description.

Referring to FIG. 4, recursive filter 20 has a multiplier 40 having one input connected to input terminal 19 and its other input connected to the output of a subtractor 48. One input to subtractor 48 is connected to a digital source 70, which always supplies a value of 1.0, while the other input is connected to control terminal 31.

The output of multiplier 40 is connected to the first of two inputs to an adder 42. The output of adder 42 is connected to output terminal 23.

A register-multiplier feedback loop is formed between output terminal 23 and the input to adder 42. The feedback loop comprises a register 44 which has its input connected to output terminal 23 and its output terminal 45 connected as one of two inputs to a multiplier 46. The output of multiplier 46 is then connected to the second input of adder 42. The other input of multiplier 46 is connected to control terminal 31. Terminal 45 is also connected to terminal 27.

Adaptive feedback means 22 has its input terminals 25 and 27 connected to subtractor 24. The output of subtractor 24 is connected to both input terminals of squaring device 26 whose output is in turn connected to the first input of a multiplying device 49. The second input of multiplier 49 is connected to a digital source 72 whose value represents a predetermined constant which is chosen to normalize the value of a signal applied to an adder 54. The output of multiplier 49 is connected to the first of two inputs of adder 54.

The output of adder 54 is connected to one of two inputs to divider 30. The other input of divider 30 is connected to a digital source 76 whose value represents the predetermined known or estimated noise power of the noise signal. Output terminal 29 of divider 30 is connected to control input terminal 31.

A register-multiplier feedback loop is connected between the output and second input of adder 54 and includes register 50 having its input connected to the output of adder 54. The output of register 50 is in turn connected to the first of two inputs of a multiplier 52 whose output is connected to the second input terminal of adder 54. The second input of multiplier 52 is connected to a digital source 74 whose value represents the length of time or number of samples the signal is averaged over.

Electronic switch 17 is operated at a rate determined by a regulating means such as clock 21. The same regulating means is used to control the rate of operation of recursive filter 20 and feedback means 22.

In operation, the composite signal 60, illustrated in FIG. 1, having an amplitude varying in time t, is applied to input terminal 16. Clock 21 causes electronic switch 17 to operate and sample the signal 60 for brief, closely spaced periods. For illustrative purposes a band of vertical lines is shown generally at 62 in FIG. 1 representing this sampling. The width $b_1$ of line 62 indicates the time during which electronic switch 17 is in the closed position, while the width $b_2$ thereof indicates the time when electronic switch 17 is open. The time during which the switch 17 is closed, called the sampling-interval, and each successive sampling-interval may be noted by a number. For example, any one sampling-interval may be denoted as $k$. The sampling-interval immediately after it may be denoted as the $(k+1)$ sampling-interval. Similarly, the sampling-interval immediately before the $k^{th}$ interval may be denoted as $(k-1)$.

Since generally the sampling-interval duration is very brief, with respect to change of the signal 60 in time, the voltage at the output of electronic switch 17 will be essentially a constant for the entire sampling period. The output of electronic switch 17 is then applied to analog-to-digital converter 18 which changes the voltage at its input to a digital number at its output. In this manner, the analog-to-digital converter 18 converts the series of sampling-interval voltages, representing points describing the shape of signal 60, into a series of digital numbers, similarly representing the shape of signal 60.

The input signal $w$ contains a true signal component, denoted as $u$, and a noise component, denoted as $n$. The combination may be expressed as: $w = u + n$. Since this relationship is true at every sampling instant, then, for any sampling-interval k, the signal may be expressed as: $w(k) = u(k) + n(k)$. The signal present at output terminal 23 of the recursive filter 20 may then be represented as $x(k)$.

Adaptive feedback means 22 receives the signal $w(k)$ at its input terminal 25. Its other input terminal 27 receives a signal $x(k-1)$ from output terminal 45 of register 44. This is because register 44 stores the previous output signal $x(k-1)$ from the previous sampling period $(k-1)$.

Subtractor 24 forms the difference between the value of the signal $w(k)$, during the sampling-interval $k$, and the value $w(k-1)$ of the signal in the interval immediately before it. This difference is then multiplied by itself in multiplier 26 resulting in the square of the difference, $[w(k) - x(k-1)]^2$.

The difference squared is then multiplied in multiplier 49 by a constant from digital source 72 whose value is chosen to normalize the average of averager device 28, and the product is supplied as the first of two inputs to adder 54.

The other input to adder 54 is the result of the multiplication by multiplier 52 of the previous value (during the $k-1$ interval) of the output of adder 54, being held in register 50, multiplied by a constant from digital source 74, whose value is representative of the length of time or number of samples the signal is averaged over. The result of addition of inputs to adder 54 is provided to an input of divider 30.

The other input to divider 30 is supplied with a number from digital source 76 whose value is representative of the average expected noise power of the noise component $n$ of the signal $w$. The number from digital source 76 is then divided by the output from adder 54 to form a ratio $a(k)$, representative of noise power $n$ to averaged-mean-source change in signal level $w$ between two successive sampling-intervals ($k$) and ($k-1$). Thus $a(k) = n//[w(k) - x(k-1)]^2$. The value of $a(k)$ is then applied to control input 31 of recursive filter 20.

The value $a(k)$ is supplied to subtractor 48, which forms an output $(1-a(k))$. This output value is then multiplied by $w(k)$ to form the first input $w(k)[1-a(k)]$ to adder 42. The second input to adder 42 is the result of multiplying $a(k)$ by $x(k-1)$, stored in register 44, thus forming an input to the adder of $a(k\times(k-1)$. Adder 42 combines these inputs to form, at filter output terminal 23, the output signal $x(k) = w(k)[1-a(k)] + x(k-1)[a(k)]$.

Figure 2A:
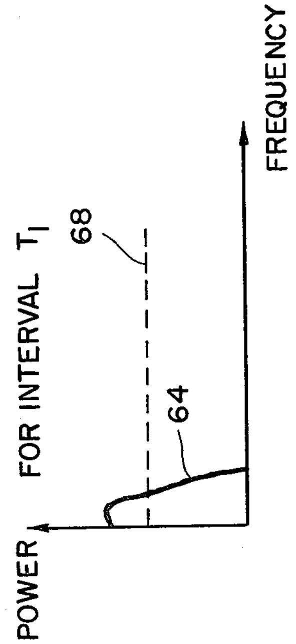
FIGS. 2*a* and 2*b*, depict the power spectrum of two portions of the input signal depicted in FIG. 1.
Figure 2B:
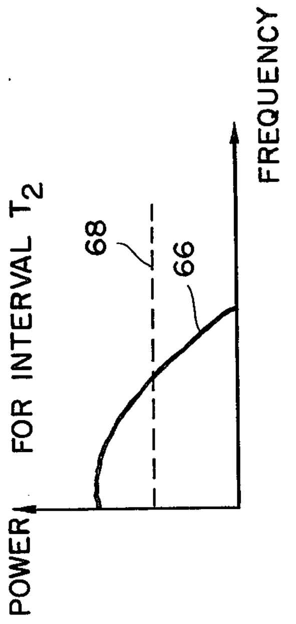

FIGS. 2*a* and 2*b* show the power bandwidth of the adaptive filter under the signal conditions corresponding to portions $T_1$ and $T_2$ respectively of FIG. 1. The average value of the noise n is indicated by dashed line 68, while the lines 64 and 66 respectively indicate the filter bandwidth corresponding to intervals $T_1$ and $T_2$.

In the case of a slowly varying signal, such as that illustrated for time period $T_1$ of FIG. 1, the error input to the divider is small, and for a given value of noise power $a(k)$ will be relatively large, approaching 1.0. In this case, the past value $x(k-1)$ of the filter 20 output is helpful in predicting what its present value $x(k)$ should be, and the bandwidth of the filter is at a correspondingly narrow value depicted in FIG. 2*a*. The amount of influence given to this prediction depends also upon the noise power inherent in the signal $w(k)$. Obviously, when there is very little noise, $a(k)$ becomes small, and the value $w(k)$ at the input is what appears at the output $x(k)$. But as noise level increases $a(k)$ approaches 1.0, and the more important becomes prediction of what the output signal should be based on its prior value. Thus, the output $x(k\ )$ is then primarily $x(k-1)a(k)$.

In the case of a wildly varying signal such as that illustrated for time period $T_2$ of FIG. 2*b*, the error input to the divider is large and, for a given value of noise power, $a(k)$ will be relatively small, approaching zero. In this case, the past value of output $x(k-1)$ would not be very helpful in predicting what its present value $x(k)$ should be, and the bandwidth of the filter is widened according as depicted in FIG. 2*b* (with a higher cutoff point than in the corresponding FIG. 2*a*). The amount of influence given to the prediction also depends on the noise power inherent in the signal $w(k)$. In the situation of large error and very little noise, $a(k)$ takes on its smallest value. This means that the best value of the output signal $x(k)$ is that of the input signal $w(k)$. As more noise is added, $a(k)$ increases and the output signal then tends to be a combination of the past value of the output signal $x(k-1)$ added together in a weighted fashion with the present value of input signal $w(k)$. Thus $x(k) = x(k-1)[a(k)] + w(k)[1-a(k)]$.

Obviously many modification and variations of the present invention are possible in light of the above teachings. It is therefore to be understood that within the scope of the appended claims the invention may be practiced otherwise than as specifically described.

What is claimed and desired to be secured by Letters Patent of the United States is:

1. An adaptive filter having a bandwidth responsive to a change of condition of an input signal comprising:
- an adjustable response characteristic digital filter having a control terminal; and
- control means coupled between the input and output of said digital filter and connected to said control terminal, said control means providing a signal to control said digital filter, said control signal being formed by the ratio of the expected noise-power of said input signal divided by a function of said input signal and the prior output signal of said digital filter.

2. The adaptive filter of claim 1 wherein said control means comprises:
- comparison means coupled between the input and output of said digital filter for comparing a first signal formed by said input signal with a second signal formed by the previous value of said output signal and for generating a third signal indicative of the difference between said first and second signals;
- root-mean-square error means connected to the output of said comparison means for generating a fourth signal formed by the average of the square of said third signal; and
- division means connected between the output of said root-mean-square error means and said control terminal for generating said control signal;
- whereby said input signal and said prior output signal are combined to form said control signal to be the ratio representing expected input signal noise divided by the average in time of the square of the difference between said input and prior output signals.

3. The adaptive filter of claim 2 further comprising:
- a first multiplier having two inputs and an output;
- an adder having two inputs and an output, last said output comprising the output of said filter;
- means connecting one of said multiplier inputs to the input of said digital filter;
- means connecting the output of said multiplier to one of said adder inputs;
- feedback means comprising delay means having an input and an output, and a feedback multiplier having two inputs and an output;
- means connecting the input of said delay means to said filter output;

means connecting the output of said delay means to one of said feedback multiplier inputs;

means connecting the output of said feedback multiplier to the other of said adder inputs;

means connecting the other of said feedback multiplier inputs to said control signal;

a subtractor having two inputs and an output;

a first digital source of value unity;

means connecting said digital source to one of said subtractor inputs;

means connecting the other one of said subtractor inputs to said control signal;

means connecting the output of said subtractor to the other of said first multiplier inputs;

whereby an input signal $w(k)$ and a prior output signal $x(k-1)$ are combined with said control signal, denoted as a, to form said adaptive filter output so that $x(k) = w(k)[1-a(k)] + x(k-1)\ [a(k)]$.

4. The adaptive filter of claim 3 wherein said root-mean-square error means is comprised of:

a second multiplier having two inputs and an output;

means connecting both of said second multiplier inputs to the output of said comparison means;

a third multiplier having two inputs and an output;

a second digital number source;

means connecting one of said third multiplier inputs to said output of said second multiplier;

means connecting said second digital number source to the other of said third multiplier inputs;

a second adder having two inputs and an output;

a second delay means having an input and an output;

a fourth multiplier having two inputs and an output;

means connecting one of said second adder inputs to the output of said third multiplier;

means connecting said output of said fourth multiplier to the other input of said second adder;

means connecting said second delay means input to said second adder output;

means connecting one of said fourth multiplier inputs to said second delay means output; said a third digital number source connected to the other input of said fourth multiplier.

* * * * *